Aug. 18, 1936.   R. D. PARKS ET AL   2,051,344
AUTOMATIC PACKAGING AND VENDING MACHINE
Filed May 22, 1933    6 Sheets-Sheet 1

Inventors
Robert D. Parks & Glenn Hildenbrand
by Bair, Freeman & Sinclair
Attorneys

Witness
Edw. Seeley

Aug. 18, 1936.   R. D. PARKS ET AL   2,051,344
AUTOMATIC PACKAGING AND VENDING MACHINE
Filed May 22, 1933   6 Sheets-Sheet 2

Aug. 18, 1936.  R. D. PARKS ET AL  2,051,344
AUTOMATIC PACKAGING AND VENDING MACHINE
Filed May 22, 1933    6 Sheets-Sheet 6

Patented Aug. 18, 1936

2,051,344

UNITED STATES PATENT OFFICE 2,051,344

AUTOMATIC PACKAGING AND VENDING MACHINE

Robert D. Parks and Glenn Hildenbrand, Lohrville, Iowa, assignors, by direct and mesne assignments, of two-fifths to John P. Kavanaugh, two-fifths to James C. Kavanaugh, both of Waterbury, Nebr., and one-fifth to Harry S. Snyder, Sioux City, Iowa Application May 22, 1933, Serial No. 672,238

16 Claims. (Cl. 226—19)

The object of this invention is to provide improved coin-controlled mechanism, electrically operated, for causing substance such as popped corn to be placed in a package and the package to be delivered to a customer.

A further object of the invention is to provide an improved vending machine adapted to contain a quantity of pop corn and also a quantity of cartons in folded position, mechanism being provided for causing a folded carton to be opened, filled with pop corn and then moved into position for delivery to a customer.

Another object of the invention is to provide an improved vending machine having a compartment for a quantity of folded cartons with means for moving said cartons one at a time into position for use, the actuation of the mechanism causing the carton so moved to be opened for receiving a quantity of substance to be vended.

Still another object is to provide improved means for automatically taking the desired quantity of substance such as pop corn from a receptacle and delivering it to a container.

A further object is to provide means for removing unpopped or partially popped kernels during the process of filling the containers.

Still a further object of the invention is to provide an improved coin-controlled electrically operated packaging and vending mechanism having a quantity of containers stored therein and also having a receptacle for the substance to be vended, suitable means being provided for preventing the insertion of a coin to the machine during the progress of a cycle of operations, or at any time when the quantity of containers or the supply of vendible substance in the machine has been depleted.

With these and other objects in view our invention consists in the construction, arrangement and combination of the various parts of our device, whereby the objects contemplated are attained, as hereinafter more fully set forth, pointed out in our claims, and illustrated in the accompanying drawings, in which:—

The automatic packaging and vending mechanism comprising the subject matter of the present invention is housed in a suitable cabinet. This mechanism for convenience preferably is located in the lower part of the cabinet and in the upper portion thereof is placed a suitable popping mechanism for keeping a quantity of pop corn in a receptacle in readiness for delivery through the operation of the packaging and vending mechanism. The popping mechanism may be of any suitable character, such for instance as is illustrated in and forms the subject matter of our co-pending application, a part of this mechanism being shown more or less conventionally in Figure 1.

The cabinet includes a frame 30 having a floor 32 and also having suitable closures for its sides, some or all of these closures being movable to open position to afford access to the interior of the cabinet. The closures for the upper part of the cabinet preferably are in the nature of glazed doors 34, while the closures for the lower part preferably are made up of three solid walls 36 at the sides and rear and a wall 38 of special construction at the front where the filled cartons of pop corn are to be delivered to the customer.

Mounted on the floor 32 of the cabinet is a motor 40 which is supplied with electric current from any suitable source of supply by means of a pair of line wires 42 and 44. The motor has a laterally projecting shaft 45 journaled in a gear housing 46 and a drive shaft 48 is journaled in suitable bearings 50 and abuts the motor shaft 45. The shaft 48 has on one end a bevel gear 52 meshing with a bevel gear 54 on a shaft 56, which is in turn operatively connected by a pinion 58 and spur gear 60 with a cam shaft 62. The shafts 45 and 48 are capable of being operatively connected as hereinafter described.

In the intermediate part of the cabinet, or in other words—in the upper portion of the space occupied by the packaging and vending mechanism, there is located a hopper-like receptacle 64 which is designed to contain a supply of popped corn, designated by the numeral 66.

Pop corn is discharged from the kettle 68 into the receptacle 64, this discharge occurring, according to our companion application heretofore referred to, by opening of the bottom member 70 when the popping operation is completed.

The receptacle 64 has a forwardly sloping rear wall 72 which is formed near one side, or adjacent one corner of the receptacle, with a longitudinal slot 74 narrow enough to prevent the passage of popped corn therethrough.

A bracket plate 76 projects downwardly from the bottom of the receptacle and is formed with a channeled track 78 parallel with and adjacent the slot 74. A plate 80 is arranged for sliding movement in the track 78 and a float arm 82 has a narrow shank 84 projecting through the slot 74 and attached to the plate 80. The float arm 82 is thus arranged for movement within the receptacle and is adapted to rest against a pile or body of popped corn such as 66, the position of the float arm at any time depending upon the quantity of corn in the receptacle, as indicated by the solid and dotted line showings in Figure 8. In this connection it may be explained that, according to our companion application heretofore referred to, means is employed for lifting the float arm 82 upwardly in the receptacle, each time the bottom member 70 of the kettle is opened for discharging pop corn into the receptacle, and for thereafter releasing said float arm and permitting it to come to rest against the enlarged body of corn such as 66.

The function of the float arm 82 and parts connected therewith, so far as the present invention is concerned, has to do only with means for automatically interrupting a circuit when the quantity of pop corn in the receptacle 64 has been exhausted. In other words—means is provided to prevent the insertion of a coin into the machine when there is no possibility that the customer can receive a container full of pop corn.

To accomplish the function just referred to, a mercury switch 86 is mounted on a switch arm 88 which is pivoted at 90 on the bracket plate 76. The switch 86 is on the lower end of the arm 88 and the force of gravity normally tends to hold it in the position shown by solid lines in Figure 8, with the free end of the arm 88 extending partially across the track 78. In this position the terminals of the switch 86 are covered by the mercury in the tube and there is, therefore, no interruption in the circuit at this point. So long as there is a sufficient quantity of corn 66 in the receptacle 64, the switch and switch arm remain in the position shown, but when the supply of corn is practically exhausted the float arm 82 is permitted to travel downwardly far enough so that its shank 84 (which is slightly offset) is permitted to engage the free end of the switch arm 88, thereby rocking said arm to the position indicated by dotted lines and thereby serving to break the circuit through the switch 86. This interruption of the circuit has the effect of preventing an attempted operation of the vending mechanism in a manner that will be hereinafter more fully described.

This preliminary explanation as to the pop corn receptacle 64 leads up to the method of and means for removing pop corn therefrom for the vending operation. For this purpose an endless elevating mechanism is employed which consists of a pair of sprocket chains 92 arranged for operation over lower sprockets 94 on a shaft 96 and over upper sprockets 98 fixed to a shaft 100, said sprocket chains carrying a series of shallow elongated cups or troughs 102. The elevator is arranged in substantially vertical position at the forward part of the machine and with its lower portion extending into the hopper or pop corn receptacle 64.

The cups 102 of the elevator at their lowest point of travel approach the bottom member 104 of the receptacle which is formed as a continuation of the sloping rear wall 72 and which preferably is curved upwardly at its forward as well as its rearward side. The elevator cups also travel in front of a baffle partition 106 which is fixed to the side walls of the receptacle and extends downwardly therein in a transverse plane and has its lower margin spaced somewhat above the lower portion of the rear wall 72, thereby providing a restricted throat opening 108 through which corn may pass from the rear part to the forward part of the receptacle for engagement by the elevator cups as they travel around the lower sprockets and upwardly in front of said baffle plate.

After the elevator chains 92 pass over the upper sprockets 98 they are caused to travel forwardly and downwardly in an inclined plane, such direction of travel being caused by engagement of the chains with idler rollers 110 located forwardly of and below the shaft 100. As the elevator cups 102 travel over this forwardly and downwardly inclined run they are inverted for discharging their contents. Somewhat below the rollers 110 there are other idler rollers 112 engaged by the sprocket chains 92 and located somewhat rearwardly of the vertical plane of the rollers 110. This arrangement causes the elevating devices to be deflected somewhat rearwardly in their downward travel to prevent interference with the objects into which the pop corn is to be discharged. The idler rollers 112 are mounted on stub shafts 111 which are supported in inclined slots 113, such slots being formed in the side walls 115 of the compartment in which the elevator is disposed. This arrangement provides for adjustment and tightening of the elevator chains.

The pop corn discharged from the elevator cups 102 is received upon a screening device composed of a frame member 114 extending transversely in front of the upper shaft 100 and carrying a series of parallel fingers or rods 116. The screening rods 116 are close enough together to prevent the passage of fully popped kernels of corn between them, but the spaces are such as to allow the passage of unpopped kernels or partially popped kernels which are too small to be desirable for eating. The substances which pass between the screening fingers 116 are received within a compartment 117, arranged between the upward and downward runs of the elevating chains, and from thence are discharged through a spout 118 to a removable waste receptacle 119.

Below the idler rollers 110 and below the lower ends of the screening fingers 116 there is arranged a vertical chute 120 carried by the frame and adapted to receive pop corn falling from the screen, and to deliver it to a container located below the lower end of said chute.

Figures 16, 17, 18, 19, 20:
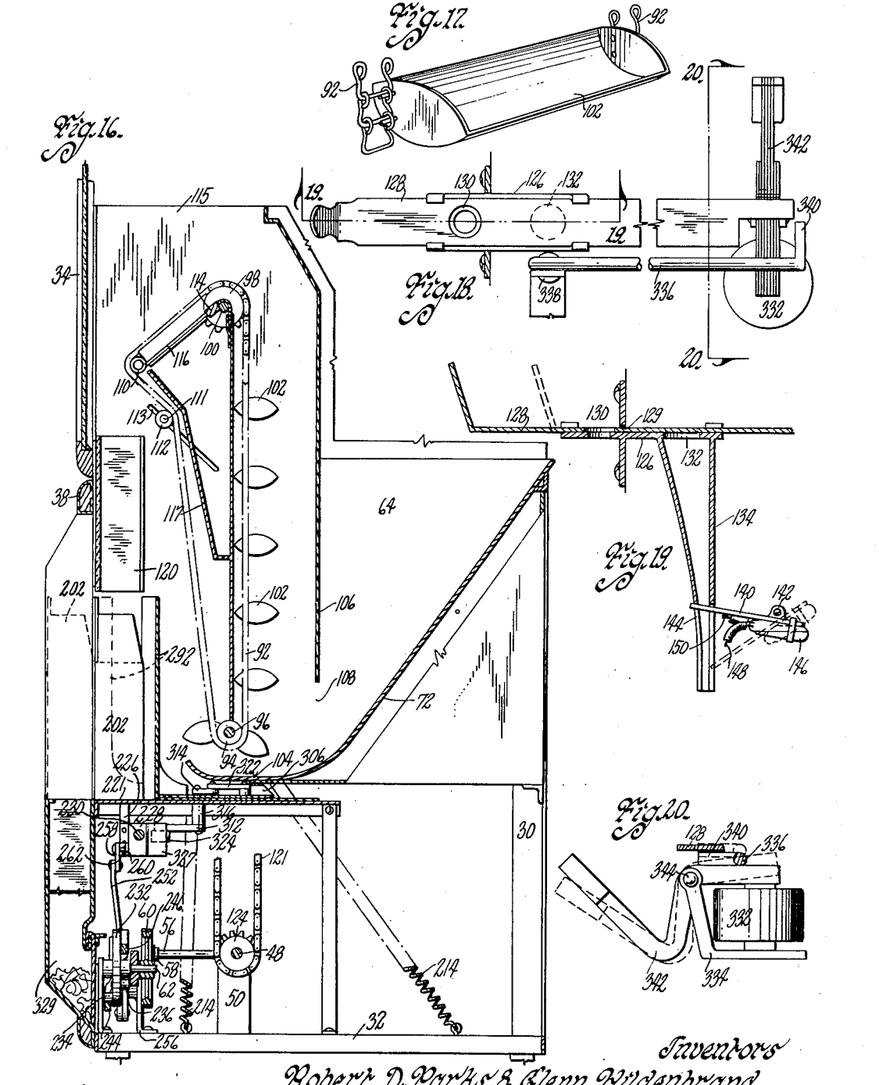
Figure 16 is a vertical section on the line 16—16 of Figure 2, illustrating particularly the means employed for elevating pop corn and delivering it to a carton, and also illustrating a part of the operating mechanism of the machine.
Figure 17 is a perspective view of one of the shallow cups or carriers of the corn elevator.
Figure 18 is a plan view, partly in section, showing the coin mechanism and the mechanism for preventing insertion of a second coin during such time as a cycle of operations is in progress.
Figure 19 is a section on the line 19—19 of Figure 18.
Figure 20 is a section on the line 20—20 of Figure 18, the dotted lines illustrating the position of the parts for preventing the deposit of a second coin.

It will be noted from the showing in Figure 16 that the elevator cups 102 are arranged on only a portion of the chains 92, and that something like more than one-half of the length of the chains is not provided with the cups. Because of this arrangement there is a considerable part of the travel period of the elevating device in which there is no discharge of pop corn. The period of this idling travel of the elevator is utilized for another operation of the mechanism, as will be hereinafter described,—namely, the action of bringing a container into position for receiving the corn when the cups 102 finally come into position for discharging their contents.

The pop corn elevator is driven from the driving shaft 48 by means of a sprocket chain 121 engaging at its upper end a driving sprocket wheel 122 on the upper shaft 100. At its lower end the chain 120 engages a sprocket wheel 124 fixed to the shaft 48.

The operation of the vending machine is arranged to be set in motion by the insertion of a proper coin through coin controlled mechanism of any suitable character. As here shown the coin control mechanism may include a supporting plate 126 extending through the front door 38 of the cabinet. A slide plate 128 is arranged for longitudinal sliding movement on the support 126 and through a slot 129 in the cabinet. The plate 128 is formed with a coin-receiving aperture 130 normally located outside of the cabinet, and said support is formed in its inner portion with a similar aperture 132 with which the aperture 130 is adapted to register when the slide plate is moved inwardly by manual pressure. A coin chute 134 extends downwardly from the apertured inner part of the supporting plate 126 and preferably is so arranged that a coin will be turned edgewise as it passes downwardly therethrough. A coin receptacle such as 136 may be placed in a suitable location in the cabinet below the lower end of the chute 134 as for instance on a shelf 138 located above the motor and operating mechanism.

A switch arm 140 is suitably pivoted between its ends at the point 142 and one end portion of said arm extends through a vertical slot 144 in the lower end of the coin chute 134. On the opposite end of the switch arm 140 is mounted a mercury switch 146 which is normally held by gravity in circuit breaking position, as shown by solid lines in Figure 19. The weight of a coin engaging the free end of the arm 140 as it passes downwardly through the chute 134 is sufficient to oscillate the parts to the dotted line position so that the mercury in the tube momentarily covers the terminals for establishing a circuit. This oscillation of the switch arm 140 permits the coin to pass on through the chute and be deposited in the receptacle 136, after which the switch arm and switch are returned to circuit breaking position by action of gravity.

To the terminals of the switch member 146 are connected a pair of conductors 148 and 150, which are in turn connected with the main line conductors 42 and 44 respectively.

Figures 21, 22, 23, 25:
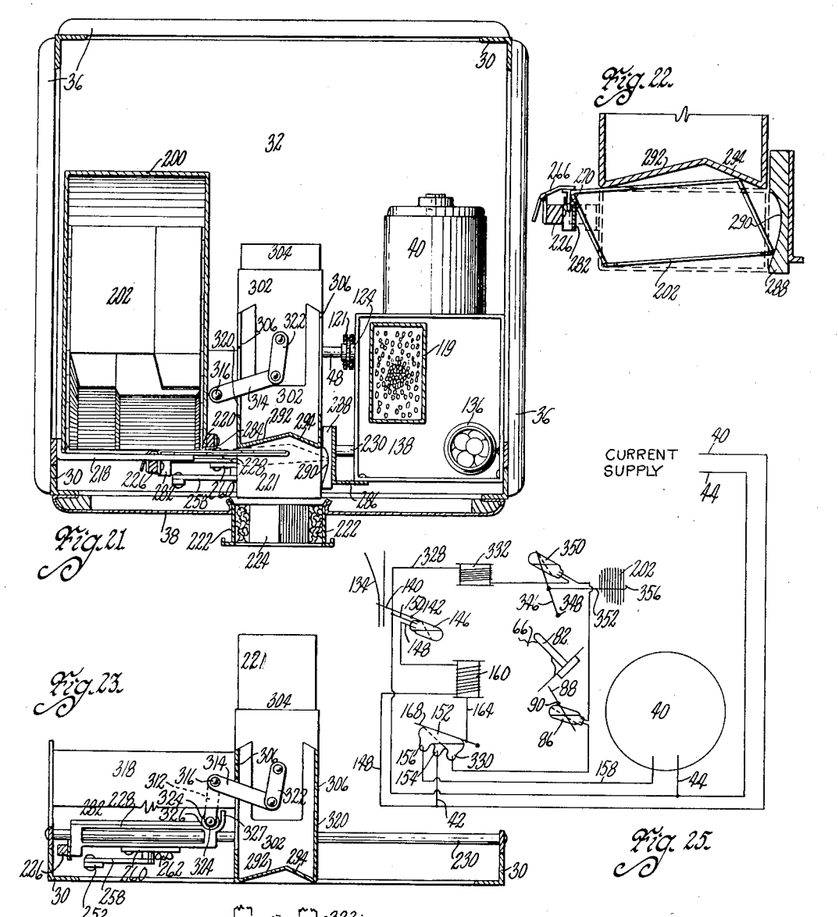
Figure 21 is a horizontal section on the line 21—21 of Figure 2, illustrating particularly the means for moving and for opening a carton as it is being moved to filling position.
Figure 22 is a detail section of part of the elements shown in Figure 21, and illustrating by solid and broken lines two later stages in the operation.
Figure 23 is a horizontal section on the line 23—23 of Figure 2, illustrating the mechanism employed for moving a filled carton to delivery position.
Figure 25 is a diagrammatic view of the electrical connections employed in connection with the mechanism.

Turning now to the circuit diagram of Figure 25, it will be noted that the line wire 44 is connected to one side of the motor 40 and that the other line wire 42 is connected to the central terminal 154 of a three-pool mercury switch 152. One of the end terminals 156 of the switch is connected by a conductor 158 to the other side of the motor, thus making up the main or motor circuit of the mechanism.

In series with the motor circuit there is arranged the starting circuit, previously referred to, including the coin operated switch 146, the conductor 148 connected with the line wire 42, and the conductor 150 connected with the line wire 44. The starting circuit and the motor circuit are normally broken, owing to the positions of the switches 146 and 152, the starting circuit being momentarily closed by the passage of a coin through the chute 134, and means is provided in connection with the starting circuit for placing the switch 152 in circuit closing position for effecting operation of the motor 40.

For the purpose just described, a solenoid coil 160 is arranged in and electrically associated with the starting circuit by connection with the conductor 148. The solenoid is vertically arranged and is supported by a bracket 162 mounted on the floor 32. The solenoid is equipped with a longitudinally movable armature 164 to the lower end of which is pivotally attached a switch detent 166 composed of a strip of inert or insulated material.

Figures 9, 10, 11, 12, 13, 14, 15:
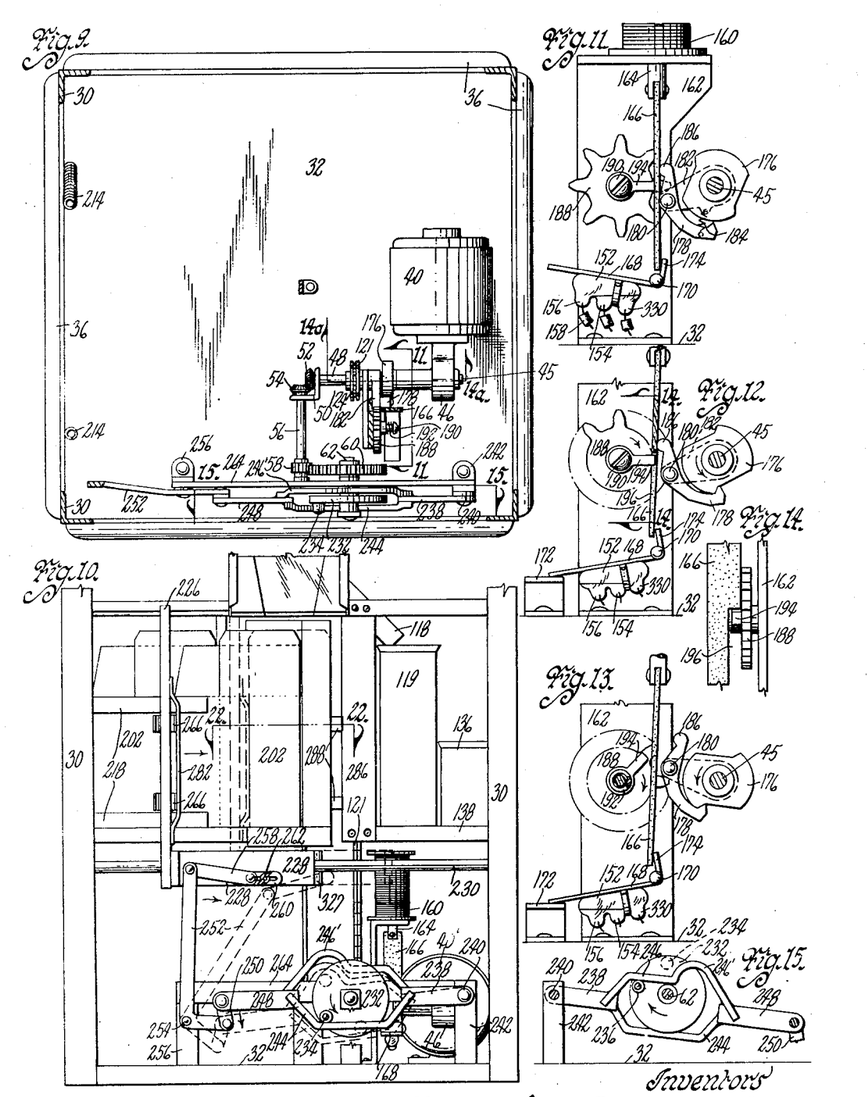
Figure 9 is a horizontal section on the line 9—9 of Figure 2, illustrating the motor and a part of the operating mechanism of the machine.
Figure 10 is a front view of the lower part of the mechanism, illustrating particularly the operation of moving a carton into position for filling.
Figure 11 is a detail vertical section on the line 11—11 of Figure 9, showing the timing mechanism for maintaining the operating circuit in closed position for a certain length of time to complete a cycle of operations, this view showing the parts in the positions occupied before the operation has been initiated.
Figure 12 is a similar view of the same parts in the positions occupied at the beginning of a cycle of operations.
Figure 13 is a similar view of the same parts as they appear immediately before a cycle of operations is completed, and just as the clutch means is about to be disengaged by the timing mechanism.
Figure 14 is a view of the same parts on the line 14—14 of Figure 12.
Figure 15 is a sectional elevation on the line 15—15 of Figure 9, illustrating certain cam devices employed for controlling the parts which serve to move a container to position for opening and filling.

The three-pool switch 152 is supported on a switch arm 168 pivoted at one end on the bracket 162 at the point 170 as illustrated particularly in Figures 11, 12 and 13. Normally the force of gravity would cause the switch arm 168 and switch 152 to assume circuit breaking position with respect to the motor circuit, by tipping to the left so that the central terminal 154 and outer end terminal 156 are covered by the mercury. In such position the free end of the switch arm 168 is supported by a stop member 172. However, the normal position of the armature 164 and the switch detent 166, when the starting circuit is broken and the solenoid 160 de-energized, is such as to hold the switch member 152 in circuit breaking position as illustrated in Figure 11. This is accomplished by engagement of the lower end of the switch detent 166 with an upstanding lug 174 on the switch arm 168 near its pivot. It is only when the switch detent 166 is in raised position (occasioned by movement of the armature 164 through energization of the solenoid 160) that the switch 152 is permitted to assume its natural position for establishing the motor circuit and it will be understood from what has heretofore been said that this is accomplished by the passage of a coin through the chute 134.

So long as the switch member 152 remains in the position shown in Figures 12 and 13, the motor will continue to operate for actuating the packaging and vending mechanism. However, means is provided for limiting the operation of the motor to a definite time sufficient to accomplish one cycle of operations, and the breaking of the motor circuit is accomplished by a timing means associated with the motor shaft 45 and motor driven shaft 48.

A ratchet wheel 176 is fixed to the end portion of the motor shaft 45 and is adapted to be engaged at times by a toothed pawl 178 pivoted between its ends at the point 180 on an arm 182 fixed to the end portion of the shaft 48 adjacent said ratchet wheel. A coil spring 184 is fixed at one end to the arm 182, and at its opposite end to the toothed end portion of the pawl 178 and it is the function of said spring to draw said pawl into engagement with a notch or shoulder of the ratchet wheel 176, when the pawl has been released by lifting of the detent 166.

This engagement establishes a connection between the shaft 45 and shaft 48 and causes the latter to be driven and to operate members connected therewith.

During such operation the end of the lever 182 is caused to engage successively with the teeth of a timing gear 188 mounted for rotation on a screw or the like 190, which projects from the face of the bracket 162. A spring 192 may be coiled on the screw 190 between its head and the face of the timing gear 188 in order to apply a slight braking effect and prevent too free rotation of said gear. During the operation the detent member 166 is swung back out of the way each time it is engaged by the end of the pawl 178, until near the end of the cycle. The timing gear 188 is formed on its face with a projection 194 radially arranged and adapted to engage the switch detent 166 at one point in the revolution of the gear for the purpose of effecting a termination of the operation when a cycle has been completed. This engagement of the projection 194 causes the switch detent 166 to be held against swinging movement to the left as viewed in Figure 13 where such engagement is illustrated as about to occur, and then it provides a backing engaged by the nose 186 on pawl 178, causing said pawl to be oscillated and disengaged from the ratchet 176, such position being shown in Figure 11. This causes the shaft 48 and its mechanism to cease operation.

As soon as the starting circuit is broken, which occurs by tilting of the switch 146 to normal position by gravity, after the coin has passed through the chute 134, the solenoid 160 is of course de-energized, thus permitting the armature 164 and detent 166 to drop by gravity. The projection 194 on the timing gear, by its engagement with the detent member 166, causes said detent member to be pressed laterally a sufficient distance to exert pressure on the upstanding lug 174, whereby the switch arm and the switch 152 are forced to circuit breaking position by lifting the free end of said arm. This movement of course serves to break the circuit and stop the motor 40 and the mechanism driven thereby. The projection 194, after having engaged the member 166, comes to rest immediately above a notch 196 formed in the lower portion of the member 166, which notch permits the projection to pass on at the beginning of the next succeeding cycle of movements.

At one side of the cabinet there is arranged a compartment 200 adapted to receive and hold a supply of containers or cartons 202 for the pop corn. The compartment 200 is of the shape and nature of a semi-cylindrical drum with its axis arranged horizontally and transversely near the front of the cabinet, the axis of the drum being defined by the shaft 204.

The cartons such as 202 which are used in this machine are of such character that they may be folded in a substantially flat condition preliminary to use and are capable of being opened or expanded by pressure on two opposite edges, thus forcing the hinged walls of the carton into rectangular outline, the two edges upon which pressure has been exerted becoming two diagonally opposite corners of the carton. The carton also embodies bottom flaps hinged to the lower edges of the side walls and adapted to assume positions for closing the lower end as the side walls assume their expanded position, the bottom flaps also including means adapted to interlock and acquire a form-sustaining position and relation when the carton has been fully expanded. This particular type of carton forms the subject matter of a separate invention which is illustrated, described and claimed in a co-pending application.

The folded cartons 202 are placed in the compartment 200 and are in superposed relation and each arranged radially of the compartment with its bottom edge engaging the inner surface of the curved or peripheral wall of the compartment. The folded cartons are placed in the compartment at its upper forward side by opening or removing one of the walls such as 34 and are packed therein in the position just related and are adapted to be delivered one at a time from the lower forward side of the compartment by lateral movement. It will be understood that the cartons at the lower front side where the delivery takes place are in upright position. The upper or rearward side of the stack of cartons in the compartment is engaged by a presser plate 206 having a hinge connection at 208 with an arm 210 which is fixed at its opposite end to the center of the shaft 204. The hinge connection at 208 permits the presser plate 206 to conform to the position of the last carton 202, which position may vary somewhat due to certain portions of the cartons being thicker than other portions thereof. The shaft 204 projects at one end through a side wall of the compartment and has an eccentrically shaped hub 212 fixed thereto. Yielding pressure is applied to the shaft and through the shaft to the arm 210 and presser plate 206 in such manner as to induce the cartons to move toward the point of delivery, thus insuring that the foremost carton of the group will be yieldingly moved toward the point of delivery. This spring pressure is applied by means of contractile coil springs 214 fixed to the bottom member 32 of the cabinet and at their opposite ends to a flexible band 216 which is in turn fixed at its free end to the hub member 212 and adapted to be wound thereon.

It should be noted that there are conditions in connection with the shape of the compartment 200, and modified by the varying number of cartons contained in the compartment, which make it necessary to employ the springs 214 at certain times, while their function is unnecessary at other times. The eccentric arrangement of the hub member 212 is such as to take care of this and to equalize the pull of the springs in accordance with the number of cartons in the compartment. Starting with the compartment full of cartons, the springs 214 act to exert pressure for about one quarter of the rotary movement of the shaft 204 and presser arm 210. When the compartment is about three-fourths full, the weight of the cartons and the direction of pressure is sufficient to cause the cartons to be fed without the necessity for spring pressure, this situation existing for substantially the next two-fourths of such rotary movement and during the last one-fourth of such movement the action of the spring is again required and the eccentric 212 is so arranged as to accomplish these purposes.

The cartons at the lower front or delivery part of the compartment 200 are pressed against a pair of spaced transversely arranged frame bars 218 which are fixed to the outer side wall of the compartment and extend nearly across its open forward side, terminating a slight distance short of the opposite side wall, which side wall is somewhat foreshortened to provide a delivery aperture at 220 through which the folded cartons may be moved laterally one at a time as illustrated in Figure 21.

A platform 221 is arranged at the central part of the machine and is adapted to receive and support a carton 202 as it is moved into position for filling. The platform 221 extends a considerable distance inwardly of the cabinet and in front of said platform there is a delivery vent in the forward wall 38, which delivery vent is defined by outwardly projecting flange plates 222 vertically arranged and spaced apart a sufficient distance to receive between them an expanded carton. At the bottom of the delivery vent is a sloping support member 224, upon which an expanded carton is projected after it has been filled, the filled carton being supported upon the member 224 and between the flange plates 222 in position for removal by a customer, as indicated by dotted lines in Figure 16.

The operation of removing cartons from the compartment 200 and causing them to be opened and placed in position and condition for filling is effected by mechanism operated from the cam shaft 62, previously referred to, and acting to cause transverse traveling movement of a vertically arranged actuating bar 226 adapted for reciprocal travel in front of the frame bars 218. The carrier bar 226 is fixed rigidly at its lower end to a traveling plate 228, which has a sliding connection with a rod 230 extending transversely of the cabinet.

Fixed to the cam shaft 62 is a wrist wheel 232 having a pair of wrist pins, one on each of its opposite faces and spaced apart a material distance circumferentially of the wheel. The leading wrist pin, having reference to the direction of rotation of the wheel 232, projects outwardly or toward the front of the cabinet and is designated by the numeral 234, while the one which is in trailing relation and projects toward the interior of the cabinet is designated by the numeral 236.

A cam actuating device cooperates with the wrist pins of the wheel 232 and includes an oscillating bar 238 pivoted at 240 on a bracket 242 rising from the floor of the cabinet. Fixed to the oscillating bar 238 are a pair of cam bars 244 and 246, one being located on each side and adjacent one of the opposite faces of the wrist wheel. The cam bar 244 is located in front of the wheel and is adapted to be engaged by the wrist pin 234, said cam bar 244 being extended downwardly between its ends below the plane of the oscillating bar to which it is attached and below the axis of the wrist wheel. The other cam bar 246 is extended upwardly on the rear side of the wrist wheel and is adapted to be engaged by the wrist pin 236. Each of the cam bars 244 has a straight line surface adapted to be engaged by the coacting wrist pin during a portion of the rotary movement of the wrist wheel for imparting oscillating motion to the cam mechanism, or in other words—to first cause a downward pressure through action of the wrist pin 234 and thereafter to cause upward pressure through action of the wrist pin 236. The cam bar 246 is arched upwardly at 246' to permit disengagement of the wrist pin 236 at about the time the other wrist pin 234 commences its engaging contact with the bar 244.

The opposite ends of the cam bars 244 and 246 are fixed to an arm 248 which has a pivotal connection through a link 250 with the short arm of a bell crank lever 252 fulcrumed at 254 on a bracket 256 rising from the floor of the cabinet.

The long arm of the bell crank lever 252 extends upwardly and has a pivotal connection through a link 258 with the traveling or slide plate 228. It may be desirable at times to adjust the relative positions of these parts and for that reason the link 258 is not pivoted directly to the plate 228 but is pivoted to a member 260 which is adjustably secured to the slide plate by means of a slot and pin connection, designated by the numeral 262.

For the purpose of securing the desired rigidity the upper ends of the brackets 242 and 256 are connected by a horizontal brace member 264.

Figures 5, 6, 7, 8:
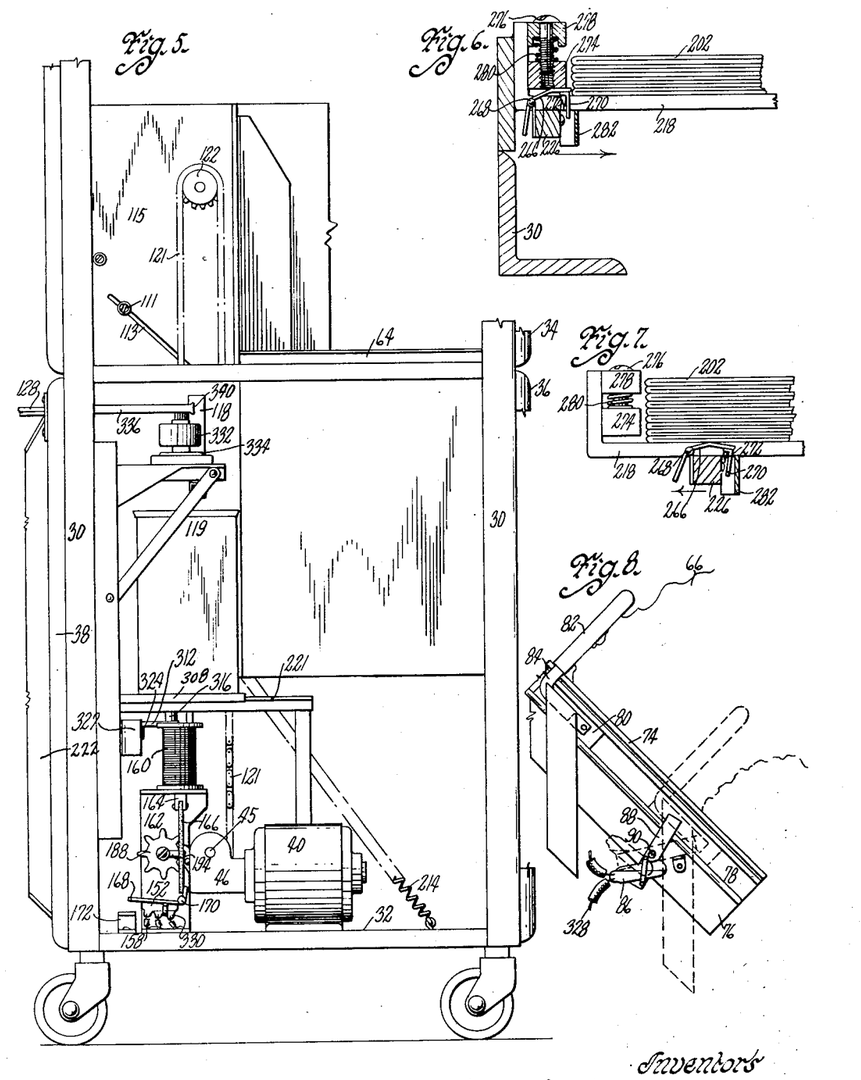
Figure 5 is a side elevation opposite to the showing of Figure 3.
Figure 6 is an enlarged horizontal section on the line 6—6 of Figure 2, illustrating part of the mechanism for moving a carton into position for filling, this view showing the parts in position for beginning the carton moving operation.
Figure 7 is a similar view illustrating the parts as they are being returned to a position of rest as a cycle of operations is being completed.
Figure 8 is an elevation illustrating a part of the popped corn receptacle and an automatic switch mechanism for interrupting a controlling circuit when the supply of popped corn in the receptacle has been depleted.

To the actuating bar 226 there is pivotally connected a selecting arm 266 which is substantially of bell crank form, being pivoted on a pin 268 which is located somewhat rearwardly of the bar 266. One portion of the arm 266 extends forwardly between the bar 226 and the left hand wall of the cabinet as viewed for instance in Figures 6 and 7. The other portion of the arm 266 extends substantially transversely and projects rearwardly beyond the frame bars 218, into the compartment occupied by the folded cartons 202. A lug 270 projects forwardly from a point adjacent the end of the transverse portion of the arm 266, projecting across the plane of the frame bars 218 and in front of the actuating bar 226. The lug 270, however, is spaced a trifle from the end of the bell crank arm 266 so that the projecting end of the latter member may be employed as indicated in Figure 6 for engaging between two of the stacked cartons 202. The bell crank arm 266 is held in such position that at the beginning of its lateral movement it will engage only the foremost one of the stack of folded cartons and cause it to be moved laterally behind the frame bars 218, the projecting point of said arm and the forwardly projecting lug 270 cooperating to engage and move the foremost one of said cartons. A light coil spring 272 is employed for urging the bell crank arm 266 to swing rearwardly as to its laterally projecting portion, said spring being located between the lug 270 and the actuating bar 226. Rearward swinging movement of this portion of the arm is limited by an adjustable stop block 274 which is carried by an adjusting screw 276 carried by a bracket 278. The screw 276 may be turned for adjusting the position of the stop block 274 and thereby fixing the limit to which the bell crank arm 266 may be swung rearwardly in the carton compartment while the actuating bar 226 is at the left hand side of the machine. The stop block 274 has a threaded connection with the screw 276 and there is a light coil spring 280 mounted on the screw between the block 274 and bracket 278 for the purpose of stabilizing the position of the block.

Figures 1, 2:
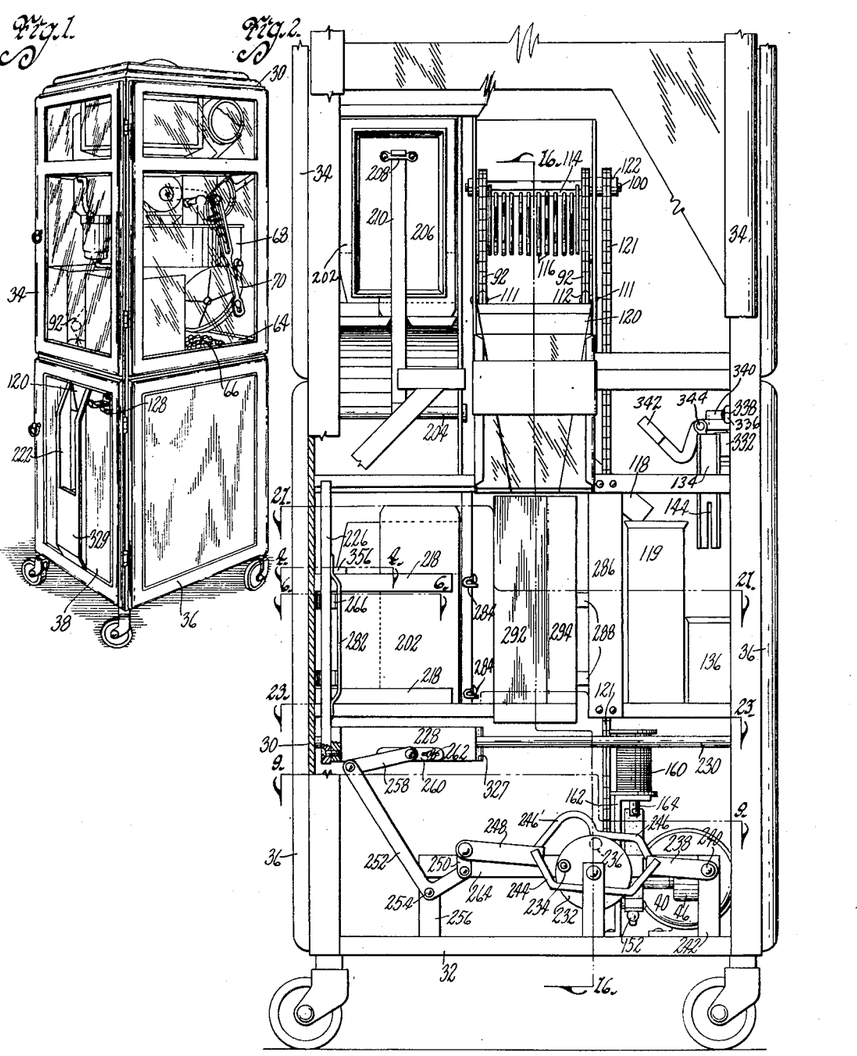
Figure 1 is a perspective view of a machine embodying not only our present automatic packaging and vending mechanism, but also an automatic popping mechanism for maintaining a supply of popped corn.
Figure 2 is an enlarged front view of the lower part of the machine illustrated in Figure 1 and illustrating the packaging and vending mechanism forming the subject matter of the present invention, the front door of the cabinet being removed to reveal interior construction.

As indicated in Figures 2 and 10, there may be two of the bell crank selecting arms 266, one located above the other on the bar 226 and cooperating with each other in securing the desired selection and movement of the folded cartons 202, one at a time from their positions in the compartment 200. An arched plate is fixed at its ends to the right hand side of the actuating bar 282, or in other words—on the side of said bar which is foremost in its sliding movement, the major portion of said plate being spaced somewhat from the bar as shown in Figures 2 and 10, for receiving and confining the end portions of the lugs 270 and for performing a part of the function of opening the folded cartons.

As the actuating bar is moved to the right, as indicated by the arrow in Figure 10, through the operation of the mechanism previously described, the projecting ends of the inner portions of the bell crank arms 266 are caused to engage between the two foremost units of the stack of folded cartons 202 as indicated in Figure 6. It will be understood that the stop block 204 is adjusted to such position, with due reference to the thickness of the folded cartons, that this projecting end will necessarily engage behind the foremost unit of the stack. The movement of the actuating bar 226 will therefore cause the foremost carton 202 only to be moved in the same direction, the thrust on the carton being supplied by the forwardly projecting lugs 270, and by such movement the carton is carried out of the compartment 200, through the delivery slot 220, and is carried to the central part of the cabinet and upon the platform 221 as indicated in Figure 21. In passing through the delivery slot 220 the cartons engage at their rear sides and slide upon guide clips 284 carried by the forward edge of the inner side wall of the compartment 200.

Vertically arranged at the opposite side of the platform 221 is a stop device comprising an angle plate 286 suitably supported by other parts of the machine and a pair of vertically spaced stop bars 288 carried by said angle plate. Each of the stop bars 288 has a concaved face 290 directed toward the platform 221 and adapted to be engaged by the advancing edge of a carton such as 202. The concavity of the face 290 of each stop bar is deeper at the rear end and tapers out toward the front end of the bar for a purpose which will be made clear, this construction being shown particularly in Figure 22.

A carton ejecting device is slidably mounted on the platform 221 and in its normal position is spaced rearwardly from the front edge of said platform and from the front wall of the cabinet a distance sufficient to permit a folded carton to be received on the forward end of said platform and moved into open position. The ejecting device includes a front wall formed of two obliquely arranged members 292 and 294 to define a re-entrant angle as shown in Figures 21 to 24 inclusive, the angle between the two wall members being disposed somewhat beyond the center line of the platform. This inwardly disposed angle of the front wall is provided for the purpose of permitting a folded carton to be expanded as its advance edge engages the stop bars 288, in the manner indicated in Figure 21. It is obvious that when the forward edge of the folded carton thus engages the stop members and further advance of the carton is thereby prevented because of continued pressure on the rear side of the carton through the bar 226 and parts carried thereby, there will necessarily result an expansion of the side walls of the carton causing it to assume quadrilateral form, as indicated by the dotted lines in Figure 21, the advance rear corner at its rear side being forced into the re-entrant angle defined by the two parts 292 and 294 of the front wall. As the pressure continues, the expanding carton gradually assumes rectangular form, the advancing corner at its rear side sliding along the right hand part 294 of the wall, and the advance corner at its forward side traveling forwardly along the concaved faces 290 of the stop bars 288, as indicated by solid lines in Figure 22.

It should be noted that near the close of the operation of opening the carton, the pushing action supplied through the bar 226 is transferred from the bell crank arms 266 to the arched bar 282, the pressure of the latter member being applied directly to the end wall of the carton as indicated in Figure 22. At the time when forward movement of the bar 226 ceases the forward right hand corner of the expanded carton has passed out of the sloping concaved faces 290 of the stop bars 288 and the carton has assumed rectangular or fully opened position as indicated by dotted lines in Figure 22, the advance corner of the rear wall thereof coming to rest against the faces of the stop bars.

The expanding movement of the side walls of the carton 202 also acts to close the bottom flaps which had previously been folded inwardly. The peculiar construction and arrangement of the bottom flaps, whereby they are caused to assume horizontal position for closing the lower end of the carton, and whereby they are caused to interlock for retaining the carton in expanded position, are all explained in our companion application hereinbefore referred to. This carton is especially designed for use in connection with a mechanical arrangement such as forms the subject matter of the present application, to facilitate the movement of the carton to expanded position for receiving a load or charge of pop corn or similar substance.

When the carton has been opened by the movement of the parts of the mechanism as just described, it is located immediately below the vertical chute 120 through which a charge of popped corn is deposited into the opened carton by action of the elevating mechanism, the relative positions of these parts being clearly shown in Figure 16. The timing of the elevating mechanism and the arrangement of the cups 102 thereon is such that the deposit of popped corn begins immediately after the carton has reached the open or expanded position.

When the wrist pin 234 has traveled far enough to lose its contact with the cam bar 244, the advance movement of the plate 228 and parts connected therewith will cease, the carton at this moment having reached its fully expanded condition. There is an interval during the rotation of the wrist wheel 232, between the time when the wrist pin 234 leaves the cam bar 244 and the time when the other wrist pin 236 engages the straight part of the cam bar 246.

During this interval the traveling plate 228 and parts connected therewith remain at rest and it is in such rest period that the operation of filling the carton is accomplished. The filling operation having been accomplished, the wrist pin 236 comes into engagement with the bar 246 and a reverse movement of the bell crank 252 takes place, causing the traveling plate 228 to begin its reverse travel toward the left hand side of the machine.

The reverse or backward travel of the plate 228 of course results in a similar travel of the actuating bar 226 and the members connected therewith, namely—the bell crank arms 266. This reverse movement continues until the pin 236 loses engagement with the straight part of the cam bar 246, whereupon the parts again come to rest for an interval, or in other words—until such time as the wrist pin 234 again engages the cam bar 244 for another cycle of operations.

At the latter part of the reverse movement just described, the bell crank arms 266 move out of engagement with the cartons 202 in the compartment and thereupon the light coil springs 272 act to swing said bell cranks rearwardly toward the stop blocks 274, placing them in position for engagement with another carton 202 at the front side of the stack of cartons in the compartment for the next operation.

The device for ejecting the filled cartons includes, in addition to the upright forward walls 292 and 294, a rearwardly extending plate portion here shown as consisting of two parts designated by the numerals 302 and 304, the one being superposed upon the other and secured thereto. The upper plate 302 is of less length than the other and is formed with upwardly extending marginal flanges 306 on its side edges. The plate member 304 is formed with downturned marginal flanges 308 (see Figure 3) engaging the side margins of the platform 221 for the purpose of guiding the ejecting device in its sliding movement.

A bell crank device is provided and is composed of a forwardly extending arm 312, a laterally extending arm 314 and a post or pin 316 which is pivotally supported on and carried by a horizontal frame member 318 of the cabinet. The bell crank arm 314 is located in a plane above the other arm and extends in a transverse direction, projecting partially across the platform 221 and plate member 302, passing through an opening 320 in the nearest side flange of said plate member. The upper or transverse arm 314 of the bell crank is pivotally connected by a link 322 to the plate member 304. The lower arm 312 of the bell crank device carries at its forward end a roller 324 adapted to engage at times in a concaved seat 326 formed on the inner face of the forward end portion of the traveling plate 228.

The seat 326 is relatively shallow at its rear or trailing edge to permit the roller 324 to pass out of it when the plate 228 has traveled forwardly a sufficient distance. The opposite or advanced edge of the seat is quite deep and the roller is never permitted to pass out at this side of the seat but is retained therein by a stop finger 327.

Figure 24:
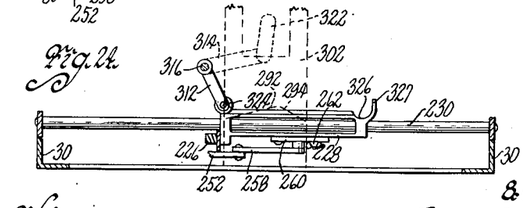
Figure 24 is a similar view on substantially the same plane and illustrating the parts at a later point in the operation.

At the beginning of the forward or advancing travel of the plate 228 for the purpose of moving and opening a carton, the roller 324 is engaged in the concaved seat 326, as indicated in Figure 23, and the movement of said plate causes the bell crank device to be oscillated on its pivot 316. This causes the transverse crank arm 314 to be moved rearwardly and to apply pressure through the link 322 upon the ejecting device, causing it to slide rearwardly on the platform 221. The ejecting device is thus moved rearwardly a sufficient distance to permit a carton to be carried upon the platform 221 and moved to open or expanded position. As the advance movement of the plate 228 and the oscillation of the bell crank device continue, the roller 324 is moved through an arc to such extent that it passes out of the seat 326 and thereafter the roller rides on the rear side of said plate as indicated in Figure 24. This engagement of the roller 324 with the plate 228 prevents reverse oscillation of the bell crank device, or in other words—serves as a positive means for retaining the ejecting device at its rearward position.

When the reverse movement of the plate 228 commences the plate travels in contact with the roller 324, which rides on its rear face until the seat 326 reaches the position of the roller, whereupon said roller enters the seat and again establishes operative connection between the traveling plate and the bell crank device. This action takes place shortly before the traveling plate 228 reaches its limit of reverse movement, and the stop finger 327 causes the roller to be retained in said seat and to move along with the plate. The reverse oscillation of the bell crank device results in a forward pulling movement, through the pivoted link 322, of the plate 304 so that the ejecting device is moved forwardly on the platform 221. This movement in turn results in pushing the filled carton forwardly from the platform upon the support member 224 and between the projecting flange plates 222. In other words, the filled carton is forced forwardly through the delivery vent in the front wall 38 of the cabinet so that it is accessible by a customer standing in front of the machine.

The projecting flange plates 222 preferably are extended downwardly along the front wall 38 of the cabinet below the delivery vent and serve to form part of a waste compartment 326 into which spilled kernels of corn may be received, the sloping arrangement of the support member 244 contributing to the discharge of the kernels into this compartment and it being understood that the lower margins of the sloping support member are spaced from the flange plates 222, as shown in Figure 21.

This completes the description of the cycle of operations set in motion by the deposit of a coin in the coin-receiving aperture of the sliding plate 128, resulting in opening, filling and delivery of a carton.

Provision is made for insuring that a second coin cannot be inserted into the mechanism while a cycle of operations is in progress. For this purpose a control circuit is provided which is arranged in parallel with a part of the motor circuit and which includes a circuit wire 328 attached at one end to the main line wire 44. The opposite end of the control circuit wire is attached to the third terminal 330 of the three-pool switch 152. When the electrical connections are made so that the machine is ready for operation, the control circuit is normally closed because of its connection with the main line wire 44 at one end and at the other end through the mercury switch 152 at the terminals 330 and 154, with the other line wire 42, the switch 152 at such time being in the position indicated in Figure 25.

Interposed in the control circuit 328 is an electromagnet 332 which is supported on a bracket 334 adjacent the inner end portion of the coin controlled mechanism. The magnet 332 is normally energized because of the closed condition of the control circuit through the mercury switch 152.

A stop arm 336 is pivoted at one end at the point 338 and has its opposite end formed with a right angled lug 340 extending across the path of travel of the inner end portion of the sliding coin plate 128 as indicated in Figures 18 and 20. The free end portion of the stop arm 336 overlies and is supported by a bent lever 342 which is pivoted between its ends at the point 344 on the bracket 334. The part of the bent lever which supports the stop arm 336 overlies the core of the magnet 332 and is attracted thereby and held in the position indicated by solid lines in Figure 20, thereby permitting the free end of the stop arm 336 to fall by gravity below the plane of the coin plate 128. The opposite end portion of the bent lever 342 is weighted and tends to fall by gravity to the dotted line position of Figure 20 when the magnet 332 is de-energized. The result of this movement is to raise the free end of the stop arm 336 so that its lug 340 will occupy the plane of the coin plate 128, immediately below the rear end thereof, and thus prevent or limit inward movement of said plate. The position of the lug 340 of the stop arm is such that the plate 128 cannot be moved inwardly far enough for the coin aperture 130 to register with the coin aperture 132 of the supporting plate and hence, when the parts are in this position, no coin can be caused to drop into the chute 134. This stop action, which is accomplished by breaking the control circuit and de-energizing the magnet 332, takes place when the three-pool switch 152 has been tilted by the previous insertion of a coin for starting a cycle of operations in the manner heretofore described, thus resulting in breaking the control circuit practically simultaneously with the closing of the motor circuit. In other words—so long as the motor circuit is in operation, there can be no insertion of a coin through the coin mechanism. When a cycle of operations has been completed the switch 152 will be returned to its normal position as previously described, thereby re-establishing the control circuit, re-energizing the magnet 332 and causing it to pull the inner end of the bent lever 342 downwardly and removing the stop lug from its obstructive position with reference to the sliding coin plate.

Although the control circuit 328 normally is closed as above stated, provision is made for breaking this circuit in the event there is some reason why the machine cannot deliver a filled carton of popped corn, such for instance as through exhaustion of the supply of pop corn in the hopper 64 or the supply of folded cartons in the compartment 200.

We have already described the tilting mercury switch 86 which is located adjacent the pop corn receptacle 64 and which normally is in closed position for establishing a circuit but which is adapted to be broken by action of the float arm 82 when the quantity of pop corn in the receptacle has been exhausted.

The mercury switch 86 is interposed in the control circuit 328 and when it is tilted to its abnormal position by downward travel of the float arm 82 through lessening of the supply of pop corn, it results in uncovering the terminals of the switch and breaking the control circuit 328 as will be understood by the diagram in Figure 25. Such breaking of the circuit of course results in de-energizing the magnet 332 and thereby moving the stop lug 340 to the dotted line position of Figure 20 just as previously described. This of course prevents effective movement of the coin plate 128 and prevents insertion of a coin into the machine during this period.

Figures 3, 4, 14A:
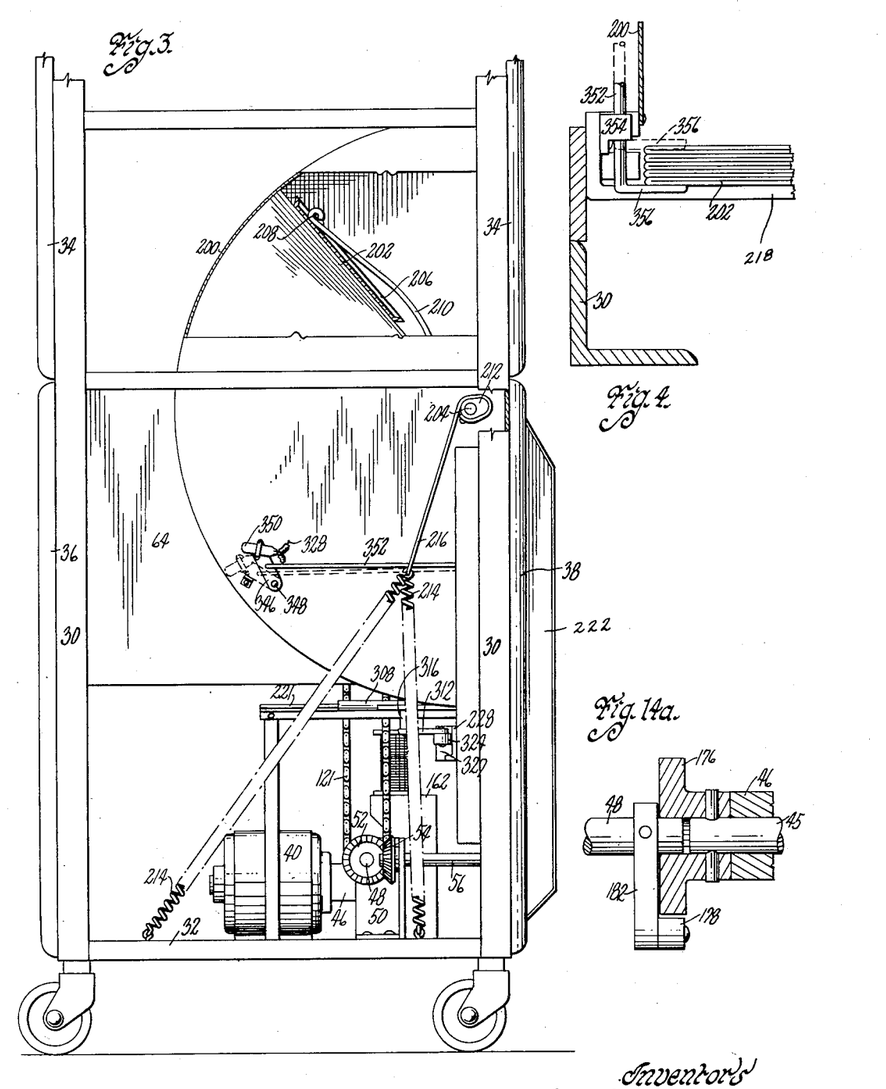
Figure 3 is a side elevation, partly in section, of the mechanism shown in Figure 2, the side wall of the cabinet being removed.
Figure 4 is an enlarged horizontal section on the line 4—4 of Figure 2, illustrating a part of the mechanism employed for causing a circuit to be broken when the supply of cartons in the cabinet is exhausted.
Figure 14a is a detail section on the line 14a—14a of Figure 9.

Provision likewise is made for accomplishing the same result when the supply of cartons is exhausted and the mechanism for this purpose is illustrated particularly in Figures 3 and 4.

A switch arm 346 is pivoted at 348 on a side wall of the carton compartment 200 and carries at its free end a mercury switch 350 which is in circuit with the control circuit wire 328. The switch arm 346 is arranged in inclined position and is normally held in such position that its terminals are covered and consequently there is no break in the control circuit at this point. The means for holding the switch in circuit closing position consists of a rod 352 pivotally connected at one end to the switch arm 346 and extending toward the front of the compartment 200. The forward end portion of the rod 352 is journaled in a slide bearing 354 which is arranged in a laterally offset portion of the side wall of the compartment and at its forward end is formed with a laterally projecting lug 356 which extends in front of the stack of folded cartons 200 in the compartment. The forward pressure on the cartons 202, afforded by the presser plate 206, arm 210 and springs 214 acting on the shaft 204 as previously described, is effective in holding the lug 356 and arm 352 in forward position, as shown by solid lines.

When the last carton 202 has been removed from the compartment the lug 356 is released and the switch arm 346 and switch 350 are permitted to move by gravitation to the dotted line position in Figure 3, in which position the terminals of the switch are uncovered. Thus the control circuit is broken at this point, resulting in de-energization of the magnet 332 and movement of the stop lug 340 to position for preventing operative movement of the sliding coin plate 128 as previously described.

We have therefore, through the use of the control circuit and the circuit breaking devices associated therewith, made suitable provision for preventing insertion of a coin to the machine during such periods as would cause the customer to lose his money, either on account of the fact that a cycle of operations was at the time in progress, or because of exhaustion of the substance to be delivered or the containers for the same.

We claim as our invention:—

1. In a packaging and vending machine, a cabinet, a receptacle adapted to contain a substance such as pop corn, a compartment adapted to contain a quantity of cartons in folded condition, said compartment being provided with a narrow vent through which the folded cartons may be singly ejected, a support at one side of said compartment adjacent said vent, a stationary stop at the far side of said support, a reciprocating member arranged for travel in front of said compartment and support and having a spring-extended part projecting within the compartment for engaging a carton, movement of said part in one direction being adapted to move a carton through said vent upon the support and upon engagement with said stop to move the carton to open position, said projecting part being retractible against the action of the spring extending it during movement in an opposite direction, an elevating device in said receptacle for taking substance therefrom and depositing it in the opened carton, and means for moving the filled carton to delivery position.

2. In a packaging and vending machine, a reciprocating member having a part for engaging and moving a carton to filling position, a motor, a cam shaft operated by said motor, a wrist wheel on said cam shaft, a rocking cam device having spaced upper and lower cam bars, a wrist pin on one side of said wrist wheel for engaging one cam bar during a part of each revolution and a wrist pin on the other side for engaging the other cam bar during another part of each revolution, whereby said cam device is swung alternately in opposite directions with periods of rest between successive movements, a bell crank lever having pivotal connections with said reciprocating member, and pivotal connections between said cam device and said bell crank lever.

3. In a packaging and vending machine, a reciprocating member having a part for engaging and moving a carton to filling position, a motor, a cam shaft operated by said motor, a wrist wheel on said cam shaft, a rocking cam device having spaced upper and lower cam bars, a wrist pin on one side of said wrist wheel for engaging one cam bar during a part of each revolution and a wrist pin on the other side for engaging the other cam bar during another part of each revolution, whereby said cam device is swung alternately in opposite directions with periods of rest between successive movements, a bell crank lever having pivotal connections with said reciprocating member, pivotal connections between said cam device and said bell crank lever, a carton moving member adapted to move a carton to delivery position after it has been filled, and means engaging said reciprocating member for holding the carton moving member inoperative until said reciprocating member reaches a certain point in its travel.

4. In a packaging and vending machine, a reciprocating member having a part for engaging and moving a carton to filling position, a motor, a cam shaft operated by said motor, a wrist wheel on said cam shaft, a rocking cam device having spaced upper and lower cam bars, a wrist pin on one side of said wrist wheel for engaging one cam bar during a part of each revolution and a wrist pin on the other side for engaging the other cam bar during another part of each revolution, whereby said cam device is swung alternately in opposite directions with periods of rest between successive movements, a bell crank lever having pivotal connections with said reciprocating member, pivotal connections between said cam device and said bell crank lever, a carton moving member adapted to move a carton to delivery position after it has been filled, means engaging said reciprocating member for holding the carton moving member inoperative until said reciprocating member reaches a certain point in its travel, and a carton filling element operated from said motor, said element being timed so that its operation begins after said reciprocating member has moved a carton to position for filling.

5. In a packaging and vending machine, a reciprocating member having a part for engaging and moving a carton to filling position, a motor, a cam shaft operated by said motor, a wrist wheel on said cam shaft, a rocking cam device having spaced upper and lower cam bars, a wrist pin on one side of said wrist wheel for engaging one cam bar during a part of each revolution and a wrist pin on the other side for engaging the other cam bar during another part of each revolution, whereby said cam device is swung alternately in opposite directions with periods of rest between successive movements, a bell crank lever having pivotal connections with said reciprocating member, pivotal connections between said cam device and said bell crank lever, a carton moving member adapted to move a carton to delivery position after it has been filled, means engaging said reciprocating member for holding the carton moving member inoperative until said reciprocating member reaches a certain point in its travel, a carton filling element operated from said motor, said element being timed so that its operation begins after said reciprocating member has moved a carton to position for filling, and a delivery member arranged to move said carton to delivery position after the completion of the operation of said filling element.

6. In a packaging and vending machine, a motor driven shaft, means operated from said shaft for moving a container to filling position, and a conveying device comprising a chain and buckets carried by said chain, said chain being driven from said shaft for causing said buckets to engage a substance and deliver it to the container, said buckets being on only a part of the length of said chain and so arranged that the substance delivery begins after the movement of said container to filling position.

7. In a packaging and vending machine, a motor driven shaft, means operated from said shaft for moving a container to filling position, a conveying device comprising a chain and buckets carried by said chain, said chain being driven from said shaft for causing said buckets to engage a substance and deliver it to the container, said buckets being on only a part of the length of said chain and so arranged that the substance delivery begins after the movement of said container to filling position, and a container delivering member timed to operate after the operation of said conveying device, for moving the filled carton to delivery position.

8. In a packaging mechanism, a storage space adapted to contain a supply of folded cartons, a concave stop, means for exerting pressure to move a single carton from said storage space and against said stop, and by continued pressure to cause a corner of said carton to traverse said stop and thereby said carton to expand and assume open position to receive the substance to be packaged.

9. In a packaging mechanism, a receptacle to contain a supply of substance to be packaged, a storage space adapted to contain a supply of folded cartons, a concave stop, means for exerting pressure to move a single carton from said space and against said stop, and by continued pressure to cause a corner of said carton to traverse said stop and thereby said carton to expand and assume open position, and means for delivering a quantity of said substance from said receptacle into said carton.

10. In a packaging mechanism, a storage space for a quantity of cartons in folded flat condition, each carton involving hingedly connected side walls and interlocking members adapted by interengagement to close one end of the space bounded by said walls, and a pair of relatively movable members, one serving to exert pressure on the edge of a folded carton and the other serving as a stop for an opposed edge, said stop having a concave face, whereby when one of said members is moved toward the other, a corner of the folded carton will traverse said concave face and said carton will thereby be expanded and its interlocking members be caused to interengage.

11. In a packaging and vending machine, a receptacle adapted to contain a supply of substance, a compartment adapted to contain a supply of folded cartons, a stationary stop having a concave part, means for exerting pressure to move one of said cartons out of said compartment and against said stop and by continued pressure in the same direction to cause a corner of said carton to traverse said concave part and said carton to thereby expand and assume open position, and means for removing a measured quantity of substance from said receptacle and depositing it in the open carton.

12. In a packaging and vending machine, a receptacle adapted to contain a supply of substance such as popped corn, a compartment adapted to contain a supply of folded cartons, a carton ejecting device, a stop for a carton, means for exerting pressure to move one of the cartons out of said compartment along one face of said ejecting device and by continued pressure, after it engages said stop, to cause said carton to expand and assume open position, said face of said ejecting device being concave to facilitate such expansion, means for removing a measured quantity of substance from said receptacle and depositing it in the opened carton, and means for moving said ejecting device and thereby the filled carton to position for delivery to a customer.

13. In a packaging and vending machine, a reciprocating member having a part for engaging and moving a carton to filling position, a motor, a cam shaft operated by said motor, a wrist wheel on said cam shaft, a rocking cam device having spaced cam bars, a wrist pin on said wrist wheel for engaging one cam bar during a part of each revolution and a wrist pin on said wrist wheel for engaging the other cam bar during another part of each revolution, whereby said cam device is swung alternately in opposite directions with periods of rest between successive movements, an operative connection between said cam device and said reciprocating member, a carton moving member adapted to move a carton to delivery position after it has been filled, and means engaging said reciprocating member for holding said carton moving member inoperative until said reciprocating member reaches a certain point in its travel.

14. In a packaging and vending machine, a reciprocating member having a part for engaging and moving a carton to filling position, a motor, a cam shaft operated by said motor, a wrist wheel on said cam shaft, a rocking cam device having spaced cam bars, a wrist pin on said wrist wheel for engaging one cam bar during a part of each revolution and a wrist pin on said wrist wheel for engaging the other cam bar during another part of each revolution, whereby said cam device is swung alternately in opposite directions with periods of rest between successive movements, an operative connection between said cam device and said reciprocating member, a carton moving member adapted to move a carton to delivery position after it has been filled, means engaging said reciprocating member for holding said carton moving member inoperative until said reciprocating member reaches a certain point in its travel, and a carton filling element operated from said motor, said element being timed so that its operation begins after said reciprocating member has moved a carton to position for filling.

15. In a packaging and vending machine, a reciprocating member having a part for engaging and moving a carton to filling position, a motor, a cam shaft operated by said motor, a wrist wheel on said cam shaft, a rocking cam device having spaced cam bars, a wrist pin on said wrist wheel for engaging one cam bar during a part of each revolution and a wrist pin on said wrist wheel for engaging the other cam bar during another part of each revolution, whereby said cam device is swung alternately in opposite directions with periods of rest between successive movements, an operative connection between said cam device and said reciprocating member, a carton moving member adapted to move a carton to delivery position after it has been filled, means engaging said reciprocating member for holding said carton moving member inoperative until said reciprocating member reaches a certain point in its travel, a carton filling element operated from said motor, said element being timed so that its operation begins after said reciprocating member has moved a carton to position for filling, and a delivery member arranged to move said carton to delivery position after the completion of the operation of said filling element.

16. In a packaging machine, a receptacle adapted to contain a substance such as pop corn, a compartment adapted to contain a quantity of cartons in folded condition, said compartment being provided with a vent through which the folded cartons may be singly ejected, a stop, a movable member having a spring extended part projecting within the compartment for engaging a carton, movement of said part in one direction being adapted to eject said carton through said vent and upon engagement with said stop to move the carton to open position, said projecting part being retractable against the action of the spring extending it during movement in an opposite direction, and means for filling said carton after it is opened.

ROBERT D. PARKS.
GLENN HILDENBRAND.